(12) United States Patent
Whitten

(10) Patent No.: US 9,856,130 B2
(45) Date of Patent: Jan. 2, 2018

(54) DIGITAL SCULLY NOZZLE

(71) Applicant: Michael Whitten, South Thomaston, ME (US)

(72) Inventor: Michael Whitten, South Thomaston, ME (US)

(*) Notice: Subject to any disclaimer, the term of this patent is extended or adjusted under 35 U.S.C. 154(b) by 2 days.

(21) Appl. No.: 14/938,320

(22) Filed: Nov. 11, 2015

(65) Prior Publication Data

US 2016/0060094 A1    Mar. 3, 2016

Related U.S. Application Data

(60) Provisional application No. 62/045,123, filed on Sep. 3, 2014.

(51) Int. Cl.
*G01F 1/00* (2006.01)
*B67D 7/42* (2010.01)
*G01F 15/06* (2006.01)

(52) U.S. Cl.
CPC ............... *B67D 7/42* (2013.01); *B67D 7/426* (2013.01); *G01F 15/06* (2013.01); *G01F 1/00* (2013.01)

(58) Field of Classification Search
CPC ................ G01F 1/00; B65B 1/30; B65C 3/00
USPC ........................... 73/861; 141/392, 94; 428/8
See application file for complete search history.

(56) References Cited

U.S. PATENT DOCUMENTS

| | | | | |
|---|---|---|---|---|
| 5,058,637 A * | 10/1991 | Fell | ................ | B67D 7/426 |
| | | | | 141/392 |
| 5,184,309 A * | 2/1993 | Simpson | ................ | B67D 7/425 |
| | | | | 141/392 |
| 5,864,975 A * | 2/1999 | Alvern | .................. | B67D 7/06 |
| | | | | 141/98 |
| 6,374,870 B1 * | 4/2002 | Muller | .................. | B67D 7/067 |
| | | | | 141/198 |
| 6,571,151 B1 * | 5/2003 | Leatherman | ......... | B67D 7/145 |
| | | | | 141/94 |
| 2005/0133113 A1 * | 6/2005 | Carder | .................. | B67D 7/3236 |
| | | | | 141/392 |
| 2007/0080244 A1 * | 4/2007 | McGarry | ............. | A62C 31/02 |
| | | | | 239/526 |
| 2009/0110803 A1 * | 4/2009 | Mather | .................. | B05B 5/032 |
| | | | | 427/8 |

* cited by examiner

*Primary Examiner* — Jewel V Thompson
(74) *Attorney, Agent, or Firm* — Jerry D. Haynes; Law Office of Jerry D Haynes PA

(57) ABSTRACT

A nozzle for oil dispensing that includes; a connector, where the connector connects the nozzle to a hose during use; an outlet, where the outlet includes an opening for the dispensing of oil through the nozzle; a handle, where the handle activates the dispensing of the oil; and a digital readout placed on the face of the nozzle below handle, where the digital readout is visible during use. Further the present invention includes a method of volume measurement for an oil distribution nozzle that includes the steps of: integrating a measurement display into a Scully nozzle; providing a digital readout on the measurement display; placing the measurement display under a handle of the Scully nozzle; and measuring oil flow volume through the Scully nozzle.

1 Claim, 1 Drawing Sheet

DIGITAL SCULLY NOZZLE

CROSS REFERENCE TO OTHER APPLICATIONS

This application claims priority to U.S. Provisional Application Ser. No. 62/045,123 filed on Sep. 3, 2014.

BACKGROUND OF THE INVENTION

Field of Invention

The present invention relates to a Scully nozzle that is equipped with a digital readout integrated directly into the nozzle below the handle.

Description of Related Art

Fuel delivery involves the transport and dispensing of fuel through the use of fuel trucks that typically have incorporated a Scully nozzle. The Scully nozzle is usually part of the Scully oil delivery system that is used for the distribution of fuel into various types of tanks. Fuel trucks typically deliver heating oil, lubricants, gasoline, jet fuel, chemicals for use in various types of applications. Fuel delivery usually involves the extension of a hose from the fuel tank on a fuel truck. At the end of the hose the Scully nozzle is used to deliver the oil directly into the tank for use by end user. The Scully nozzle typically has an outlet with a turn handle and a male inlet connector that connects the nozzle to a hose. Normally during the delivery of oil, oil delivery personnel must stop fueling to confirm the number of gallons that have been pumped through the hose. The current system involves a meter inside the oil delivery truck that provides data regarding the amount of fuel dispensed. Using the current meter can increase the amount of time necessary to deliver fuel due to the constant stopping of the nozzle to check meter readings within the delivery truck. As a consequence, it would be advantageous to have a display integrated directly into the nozzle that is able to provide the flow rate and the number of gallons that have been delivered during a particular delivery. Such a digital readout may increase the efficiency in oil delivery for various types of fuels such as heating, diesel, gasoline and kerosene.

SUMMARY OF THE INVENTION

The present invention relates to a nozzle for oil dispensing that includes; a connector, where the connector connects the nozzle to a hose during use; an outlet, where the outlet includes an opening for the dispensing of oil through the nozzle; a handle, where the handle activates the dispensing of the oil; and a digital readout placed on the face of the nozzle below handle, where the digital readout is visible during use. Further the present invention includes a method of volume measurement for an oil distribution nozzle that includes the steps of: integrating a measurement display into a Scully nozzle; providing a digital readout on the measurement display; placing the measurement display under a handle of the Scully nozzle; and measuring oil flow volume through the Scully nozzle.

DETAILED DESCRIPTION

The present invention relates to a Scully nozzle that has a digital display readout incorporated within the face of the nozzle. The present invention has integrated a digital display onto the face of the Scully nozzle that provides an active readout of oil flow through the nozzle. This active readout gives a user an accurate determination of the number of gallons that is being pumped through the nozzle. The digital readout therefore eliminates the need for checking meters within the truck and allows the user to more effectively deliver oil. The digital readout according to the present invention is below the handle, which is normally turned to provide a clear view of the gallon delivery through the nozzle.

Figure 1:
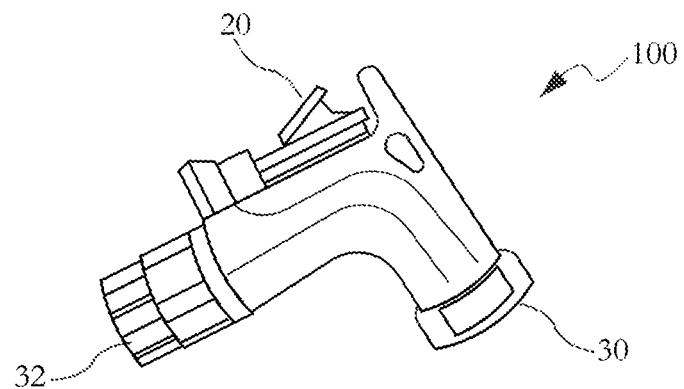
FIG. 1 depicts perspective view of a Scully nozzle in accordance with the present invention.
Figure 2:
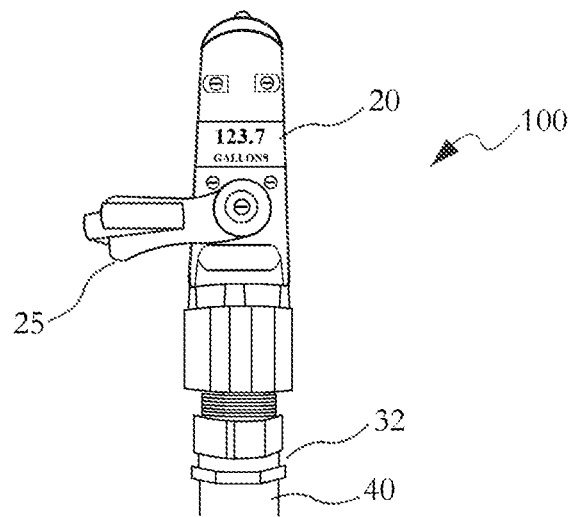
FIG. 2 depicts a top view of the Scully nozzle equipped with a digital display incorporated within the nozzle.

In reference to FIG. 1, a perspective view of a Scully nozzle 100 in accordance with the present invention is depicted. As shown the Scully nozzle includes a connector 32 that connects the nozzle 100 to a hose 40 during use. An outlet 30 is provided that includes an opening for the dispensing of oil through the nozzle 100. A digital readout is placed on the face of the nozzle below handle 25. Handle 25 is shown clearly in FIG. 2 in a turned position. The digital readout 20 is just below the handle 25 integrated within the nozzle 100 to measure oil flow through the nozzle 100. Connector 32 connects the nozzle 100 to the hose 40 as shown in FIG. 2. The digital readout provides a volume flow and the number of gallons as depicted in FIG. 2. This accurate depiction of volume flow therefore provides the user with a clear display of oil delivery through the nozzle. The digital readout may be reset and calibrated as necessary by the user. Incorporation of the digital display therefore allows the user to easily manage the oil flow through the nozzle and provides for optimum and efficient delivery of oil through the Scully nozzle 100. The instant invention has been shown and described in what it considers to be the most practical and preferred embodiments. It is recognized, however, that departures may be made there from within the scope of the invention and that obvious modifications will occur to a person skilled in the art.

What is claimed is:

1. A method of volume measurement for an oil distribution nozzle comprising the steps of:
   a. integrating a measurement display into a Scully nozzle;
   b. providing a digital readout on the measurement display;
   c. placing the measurement display under a handle of the Scully nozzle; and
   d. measuring oil flow volume through the Scully nozzle.

* * * * *